March 9, 1943.   H. W. MITCHELL   2,313,393
APPARATUS FOR WELDING
Filed Aug. 3, 1940   3 Sheets-Sheet 1

INVENTOR.
HARRY W. MITCHELL
BY
ATTORNEYS.

March 9, 1943.   H. W. MITCHELL   2,313,393
APPARATUS FOR WELDING
Filed Aug. 3, 1940   3 Sheets-Sheet 3

INVENTOR.
HARRY W. MITCHELL
BY
ATTORNEYS.

Patented Mar. 9, 1943

2,313,393

UNITED STATES PATENT OFFICE 2,313,393

APPARATUS FOR WELDING

Harry W. Mitchell, Shaker Heights, Ohio, assignor to Mitchell Metal Products, Inc., Cleveland, Ohio, a corporation of Ohio Application August 3, 1940, Serial No. 350,593

6 Claims. (Cl. 113—84)

This invention relates generally to welding and has reference more particularly to an apparatus for automatically and continuously or progressively depositing welding material between two parts, such as a container body and a cover therefor for welding them together.

Where the cross-section of such parts is circular, apparatus heretofore old in the art would successfully present the parts for continuous welding. However, where such cross-section is irregular, i. e., where it is both non-circular and curved, is a broken line, or is a combination of the former and the latter, apparatus and teaching old in the art will not successfully present the parts for arc nor gas welding. This is because in order to produce a uniform weld seam, stationary welding means must have the work presented to it in such a way that a constant and uniform space exists between the welding means and the work. Obviously a device adapted for circular work will not meet the requirement due to the absence of means for compensating for the variation of the radii of irregular work. It is to this opening or gap in apparatus heretofore known to which this invention is directed and which this invention remedies.

The primary and general object of the present invention has been to provide an apparatus for automatically continuously welding along a line which is broken or which is both curvilinear and non-circular.

Another object of this invention has been to provide the above described apparatus with power driven work handling means.

A specific object of this invention has been to provide an apparatus, as above identified, which is adapted for mass production of containers, the cross-section of which is substantially rectangular.

To the accomplishment of the foregoing and related ends, said invention, then, consists of the means hereinafter fully described and particularly pointed out in the claims; the annexed drawings and the following description setting forth in detail certain means and one mode of carrying out the invention, such disclosed means and mode illustrating, however, but one or several of various ways in which the principle of the invention may be used.

Arc welding arond the circumference of a circular object can readily be accomplished by rotation about the axis thereof with a stationary electrode maintained at a predetermined and constant distance from such article. But when the cross-section is not circular, it will be seen that during rotation about a fixed axis variations will be had in the space between the article and the fixed electrode and it will be further seen that successful operation requires moving of the axis to compensate for the various radii of the article so as to maintain a constant spacing between the fixed electrode and the periphery of the article.

By the word "fixed" with respect to the electrode, reference is made to the tip or arc end thereof, it being understood that the tip is constantly melting away and that the body of the electrode is fed towards the work.

Figure 6:
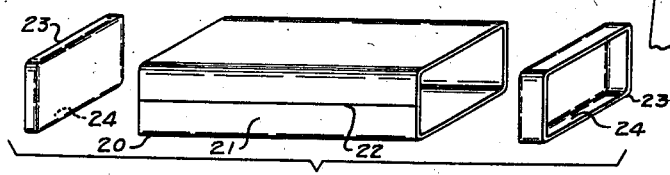
Fig. 6 is a perspective view of an open container body and two covers therefor.
Figure 7:
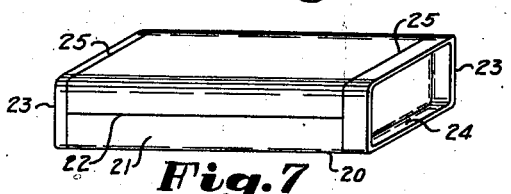
Fig. 7 is a perspective view of the container seen in Fig. 6 after the covers have been secured to the body thereof.

My invention is particularly adapted for producing a powder storage container the body which, as seen in Figs. 6 and 7, is substantially rectangular in transverse cross-section with relatively large radii 20 interconnecting the sides 21 thereof. The body is made of one piece of sheet metal which is formed and then the edges thereof welded as at 22. The open ends of the body are closed by two covers 23, 23, which are recessed inwardly at 24. The body adjacent portion of the covers is radiused or tapered so that in assembly, the covers, when urged towards each other, wedge themselves into intimate contact with the body where the covers are welded to the body as at 25.

Figure 1:
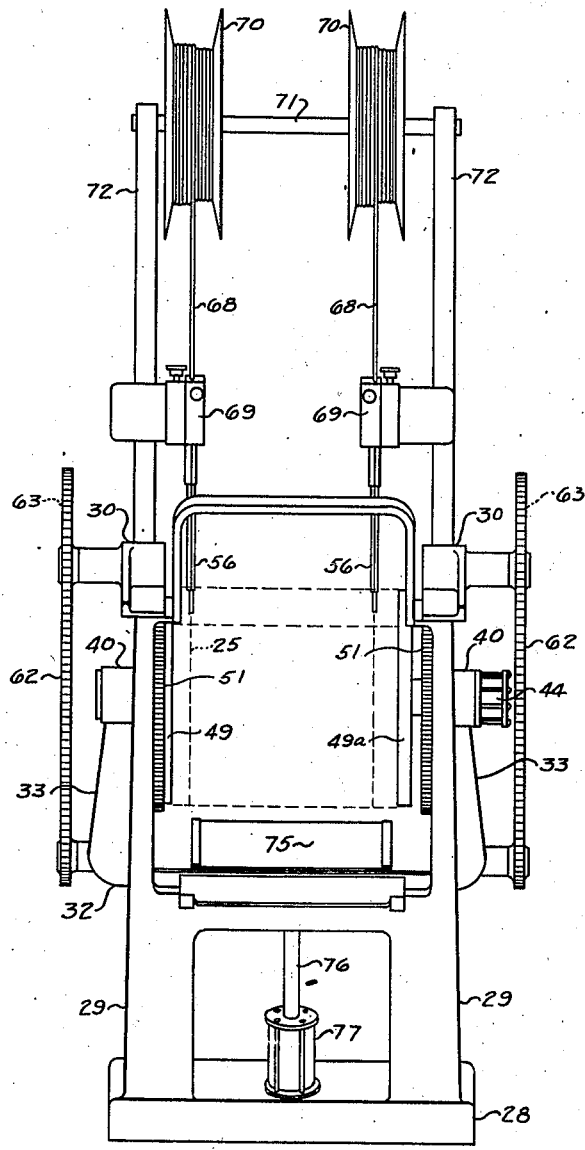
Fig. 1 is a front view of apparatus having incorporated therein the principal features of this invention.
Figure 2:
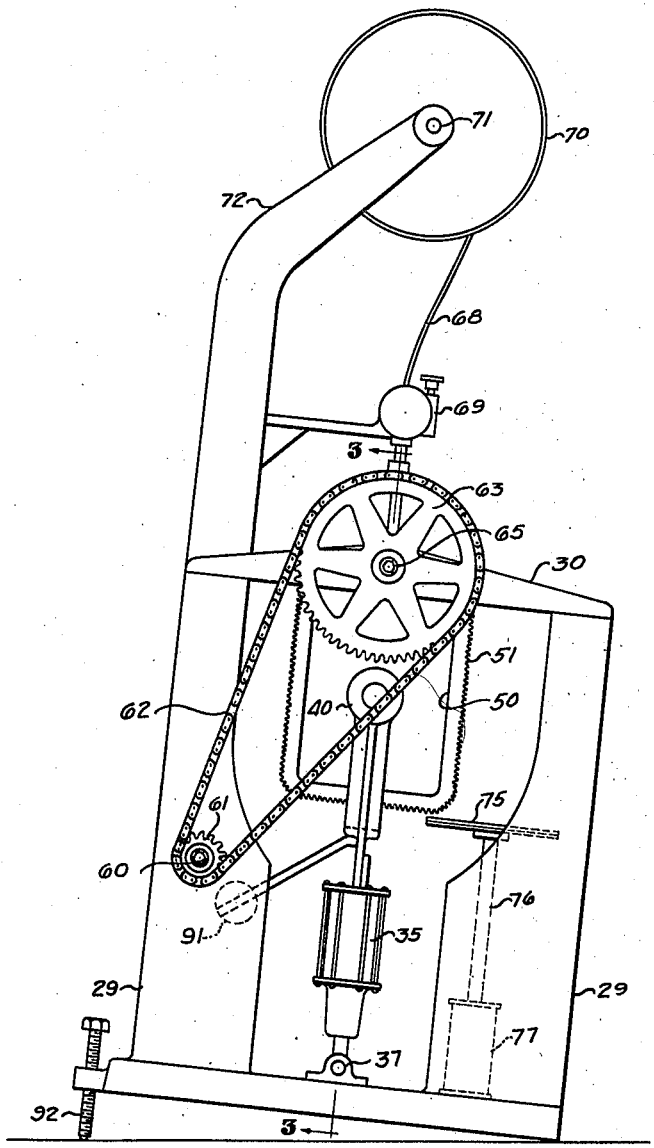
Fig. 2 is an end view of Fig. 1.
Figure 3:
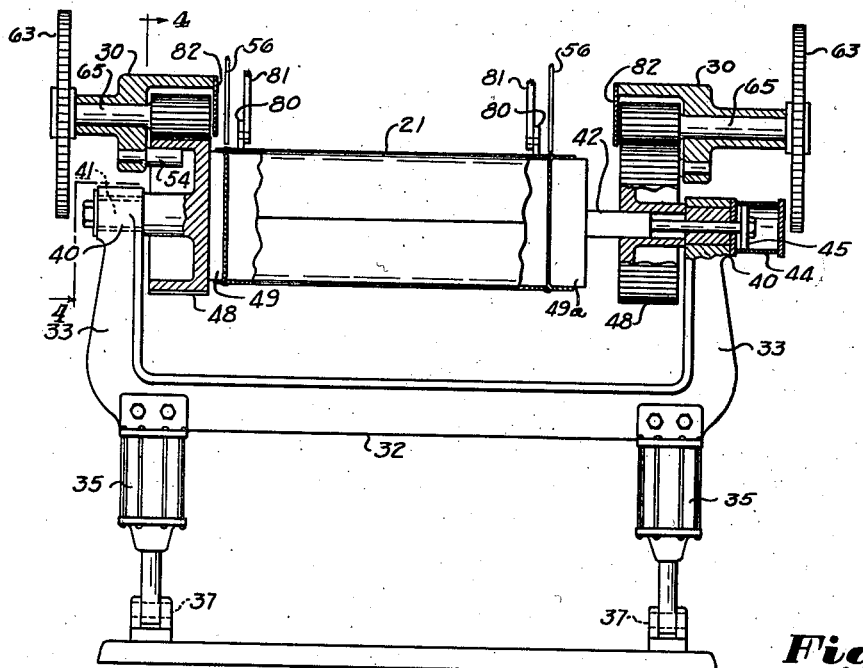
Fig. 3 is a section taken on the line 3—3 of Fig. 2.

With reference now more particularly to Figs. 1, 2, and 3 it will be seen that the frame of a device incorporating this invention comprises a rectangular base 28 provided at the corners thereof with four uprights 29 which are interconnected by cross members 30 each provided with a slidway 31. For supporting the work, means universally movable in one plane are provided and will now be described.

Such work support means are disposed between the front and rear uprights and comprise a generally C shaped member 32, the reaches 33 of which are adapted, as will hereinafter appear, for rotatably supporting the work therebetween. Suitably secured to this C member by bolting or the like and depending therefrom is a piston and cylinder identified generally by the reference character 35, one of which is connected to the C member and the other of which is pivotally supported by the base as at 37. This piston and cylinder act as cushions and normally urge the C member upwardly. Thus the C member with respect to the base is rectilinearly and rotatably movable or is universally movable in one plane. It will of course be understood that other means may be provided for universally moving the C member in one plane.

It has been above indicated that the work is rotatably supported by and between the reaches of the C member and consequently these reaches terminate in trunnion cradles 40 for trunnions 41 and 42. The trunnion cradle which accommodates the trunnion 42 is provided with a cylinder 44 in which reciprocates a piston 45, the latter being connected to the trunnion 42. By supplying fluid under pressure to one or the other side of the piston 45, it will be seen that the trunnion 42 will be actuated axially.

For rotating the trunnion, gear means are provided and preferably comprise a pair of gears 48, one keyed to the trunnion 41 and the other rotatably keyed to and axially slidable relatively to the trunnion 42. One of these gears is provided with a projection 49 and the trunnion 42 is provided with a projection 49a, both projections being shaped so as to be adapted for entering the recesses 24 for rotating the work.

Figure 4:
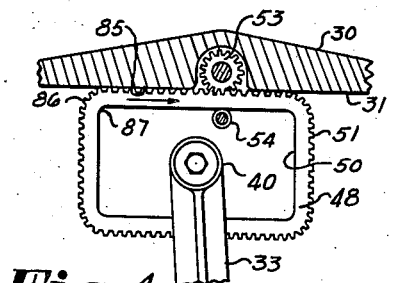
Fig. 4 is a section taken on the line 4—4 of Fig. 3.
Figure 5:
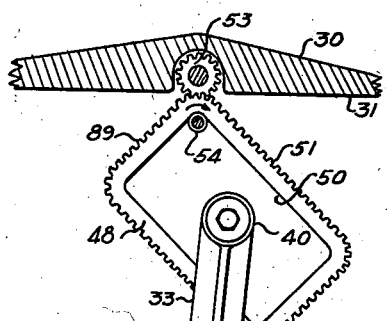
Fig. 5 is a view similar to Fig. 4, but showing the elements thereof in a different position.

With particular reference to Figs. 4 and 5, the gears 48 and their immediately cooperating elements will now be described. These gears are shaped so as to substantially conform to the transverse configuration or cross-section of the work. In the instant case the work is, by way of illustration, substantially rectangular and, as is seen in Figs. 4 and 5, the gears are also substantially rectangular. Each of the gears is provided with a recess 50 the outer wall of which, like the periphery of the teeth 51 thereof, is provided with a configuration similar to that of the work. Rotatably carried by the cross member 30 is a pinion 53 adapted for driving the gear 48 and a roller 54 adapted for rolling along the outer wall of the recess 50. From the foregoing it will be seen that that portion of the periphery of the work which is in between the centers of the rollers 54 and their respective pinions 53 will be maintained at a constant distance or space from the frame of the device. As will hereinafter more fully appear a pair of welding means 56 is carried by the frame, one adjacent each of the gears 48 for depositing welding material between the body 21 and each of the covers 23 of the work.

Suitable means for transmitting rotational energy to the pinion 53 is provided and by way of illustration comprises a driven shaft 60 which is journaled to the back uprights. Keyed to each enr of this shaft is a pair of sprocket wheels 61 which by means of a pair of chains 62 drive a pair of sprocket wheels 63, the latter and the pinion 53 being suitably keyed to a pair of shafts 65 which are journaled to the cross members 30.

The welding means heretofore referred to are preferably of the arc type and, as is seen in Figs. 1 and 2, comprise a pair of electrodes 68 fed towards the work by suitable feeding means 69 from overhead coils 70 which are suitably rotatably carried by a shaft 71, the latter being supported by a pair of braces 72 which are in turn supported by the frame.

For facilitating handling of the work, power driven means are provided and comprise a table 75 which by a connecting rod 76 is actuated upwardly or downwardly by piston and cylinder means 77, the latter resting against and secured to the base. It will of course be understood that the various pistons and cylinders may be actuated by a suitable source of fluid under pressure and controlled by suitable valves, neither of which is shown.

Grounded means, such as suitable movable rollers 80 may be provided. For preventing warping of the work, these rollers may be suitably urged towards the work. Means, not shown, may be provided for actuating supports 81 of the rollers.

In operating a device having incorporated therein the principal features of this invention, the two covers 23 of Fig. 6 and the body 21 are manually held in assembled relationship on the table 75 and are elevated into position between the reaches of the C member. The piston and cylinder means 44 urges the trunnion 42 to the left of Fig. 3 so that the projections 49 and 49a enter the recesses 24 and by the said wedging action urge the cover into intimate contact with the body, and the rollers 80 are positioned in engagement with the work.

Individual sources of suitable electrical energy are connected to each of the electrodes 68 whereupon current will flow or arc between the electrodes and the work and flows outwardly through the grounded rollers 89. The heat created by the arc tends to warp the body and such warping is resisted by the rollers 80. The arcing and the depositing of metal has a detrimental effect upon the gear and pinion and for this reasond a shield 82 may be provided.

As soon as the electrodes are energized the shaft 60 and consequently the pinions 53 are actuated and commence rotation. This causes the gears 48 to rotate in synchronism and, with references more particularly to Fig. 4, it will be seen that the flat portions of the teeth of the gear 48 slidably engage the slideways 31 of the cross members 30 as at 85. During such sliding motion between the gears and the cross members, the work will move solely rectilinearly until the pinion has actuated the gear sufficiently to the right of Fig. 4 so as to cause the latter to mesh with the radius teeth 86 of the latter. When the teeth 86 are in mesh, the roller 54 has rolled along the recess 50 and contacts the radius corner 87 thereof. This condition is better seen in Fig. 5 wherein it will be obvious that further rotation of the pinion 53 no longer actuates the gear 48 to the right unless and until the recess 50 pivots about the roller 54 so as to bring the straight teeth 89 of one of the shorter sides of the gear into sliding contact with the cross members. In other words in Fig. 4 the gear slides along and in Fig. 5 the gear pivots about the roller 54. After such pivoting action is completed the gear will appear as it is in Fig. 4 except that the shorter side of the gear will slide along the cross members. There is a tendency for the gear while it pivots about the roller 54 to jerk and for this reason a counterweight 91 is provided and secured to the C member. During the sliding and during the pivoting action of the gear, the C member, due to the piston and cylinder 35 and the pivot 37, will move up and down and will rotate relatively to the base. After the gear 48 has rotated for 360° the seam 25 will be complete and the electrodes and the shaft 60 de-energized, and the rollers 80 disengaged. The table 75 is then brought into engagement with the work and the trunnion 42 actuated to the right of Fig. 3 so that the work is released from between the reaches and rests upon the table 75 which is then lowered and the work removed, thus completing the operating cycle. In order to cause the deposited welding material to flow ahead of the arc the entire device may be maintained at any suitable degree of inclination by suitable means such as by a bolt 92.

From the foregoing it will be seen that during the entire 360° rotation of the work, the welding means are maintained at a constant distance from the work. It will be further seen that this constant distance relationship is available for work the cross-section of which is other than rectangular if the teeth and the recess of the gear 48 are made to conform to such cross-section. For instance, if this cross-section were elliptical or triangular the teeth and recess of the gear would accordingly be made elliptical or triangular. It will also be seen that sharp corners may be accommodated by this invention and that the degree of such sharpness is restricted solely by the radii 84 and 85 of the gear and the radii of the roller 54.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In a device for welding an irregularly shaped container and cover together, a base, two pairs of uprights extending from the base and carrying substantially parallel connecting members, a C-frame between the pairs of uprights, said frame being supportingly mounted on said base for pivotal movement and for movement toward and away from the pivot, stationary welding means for depositing welding material between said container and cover for welding them together, and means on opposite ends of said frame and on the connecting members for holding and rotating said assembled container and cover and for maintaining them at a fixed distance from said welding means during rotation thereof.

2. In a device for welding an irregularly shaped container and cover together, a base, a frame carrying irregular gears shaped to conform to the shape of the container and cover, said gears having means for supporting between the gears an irregularly shaped container body and cover, stationary welding means for depositing welding material between said container and cover for welding them together, means carried by the base and engaging the said gears for rotating the same, so that the assembled container and cover are maintained at all times at a fixed distance from the welding means, said frame being supportingly mounted on said base for pivotal movement and for movement toward and away from the pivot, so that the frame may move to accommodate rotation of the irregular gears.

3. In a device for welding an irregularly shaped container and cover together, a base, stationary welding means for depositing welding material between said container and cover for welding them together, a frame supportingly mounted on said base for pivotal movement and for movement toward and away from the pivot, means on said frame for rotatably holding both ends of the irregularly shaped container and cover assembly, and means for rotating said assembly holding means on the movably supported frame and for maintaining the assembly at a fixed distance from said welding means during the rotation of the assembly.

4. In a device for welding an irregularly shaped container and cover together, a base, stationary welding means for depositing welding material between said container and cover for welding them together, a frame supportingly mounted on said base for pivotal movement and for movement toward and away from the pivot, means on said frame for rotatably holding both ends of the irregularly shaped container and cover assembly, and means for rotating said assembly holding means on the movably supported frame and for maintaining the assembly at a fixed distance from said welding means during the rotation of the assembly, and means normally urging the frame away from said pivot.

5. In a device for welding an irregularly shaped container and cover together, a base, stationary welding means for depositing welding material between said container and cover for welding them together, a frame supportingly mounted on said base for pivotal movement and for movement toward and away from the pivot, means on said frame for rotatably holding both ends of the irregularly shaped container and cover assembly, said means including gears, having extensions thereon engaging the cover and container respectively, means for urging one extension toward the other to clamp the assembled container and cover therebetween and means for rotating said assembly holding means on the movably supported frame and for maintaining the assembly at a fixed distance from the welding means during the rotation of the assembly.

6. In a device for welding poly-sided end covers provided with similarly shaped recesses therein to a poly-sided container body, a base, stationary welding means for depositing welding material between said container and covers for welding them together, a frame supportingly mounted on said base for pivotal movement and for movement toward and away from the pivot, means carried by said frame for rotatably holding both ends of the poly-sided container and body assembly, said means including opposed projections shaped to conform to the shape of the recesses in the covers and engaging within said recesses to support the assembled container and cover and to provide means for turning the same, means for rotating said assembly holding means on the movably supported frame and for maintaining the assembly at a fixed distance from said welding means during the rotation of the assembly.

HARRY W. MITCHELL.